(12) United States Patent
Mehrtash et al.

(10) Patent No.: US 12,417,269 B2
(45) Date of Patent: Sep. 16, 2025

(54) IDENTIFICATION VERIFICATION SYSTEM

(71) Applicants: Seyed Mehdi Mehrtash, Vancouver (CA); Gordon Clifford Jessop, Delta (CA)

(72) Inventors: Seyed Mehdi Mehrtash, Vancouver (CA); Gordon Clifford Jessop, Delta (CA)

(*) Notice: Subject to any disclaimer, the term of this patent is extended or adjusted under 35 U.S.C. 154(b) by 261 days.

(21) Appl. No.: 17/794,937

(22) PCT Filed: Jan. 25, 2021

(86) PCT No.: PCT/CA2021/050076
§ 371 (c)(1),
(2) Date: Jul. 22, 2022

(87) PCT Pub. No.: WO2021/146818
PCT Pub. Date: Jul. 29, 2021

(65) Prior Publication Data
US 2023/0134002 A1    May 4, 2023

Related U.S. Application Data

(60) Provisional application No. 62/964,798, filed on Jan. 23, 2020.

(51) Int. Cl.
*G06F 21/32* (2013.01)
*G06F 21/60* (2013.01)
*G06F 21/62* (2013.01)

(52) U.S. Cl.
CPC ............ *G06F 21/32* (2013.01); *G06F 21/602* (2013.01); *G06F 21/6245* (2013.01)

(58) Field of Classification Search
CPC .... G06F 21/32; G06F 21/602; G06F 21/6245; G06Q 2220/00; G06Q 20/4014;
(Continued)

(56) References Cited

U.S. PATENT DOCUMENTS 9,697,667 B1 * 7/2017 Cipriano ............. G06F 16/2455
2019/0042719 A1 * 2/2019 Miu ..................... H04L 63/0861
(Continued)

FOREIGN PATENT DOCUMENTS

| CN | 101976321 A | 2/2011 |
| EP | 3316206 A1 | 5/2018 |

(Continued)

*Primary Examiner* — Han Yang
(74) *Attorney, Agent, or Firm* — McMillan LLP

(57) ABSTRACT

This disclosure describes embodiments of a closed, permission-only based system that provides a highly secure, identity verification platform that enables users or consumers to protect and manage their own identity related data without relying on a third party source. In general, the system includes a server having a processor, an input interface in communication with the processor, a network interface in communication with the processor, and a processor readable medium in communication with the processor. The processor readable medium stores processor executable instructions. The processor executable instructions, when executed, cause the processor to take the steps of: receiving user data including an image of at least one document; receiving biometric data of the user from a user device of the user; performing validation of said at least one document using said biometric data; and encrypting the user data with an encryption key obtained from the biometric data.

12 Claims, 6 Drawing Sheets

(58) Field of Classification Search
CPC ............ G06Q 20/40145; G06Q 50/265; H04L 2209/56; H04L 9/3231; H04L 9/0866; H04L 9/50; H04L 63/0861
See application file for complete search history.

(56) References Cited

U.S. PATENT DOCUMENTS

2019/0089702 A1\* 3/2019 Bhatt .................. H04L 63/0884
2022/0038291 A1\* 2/2022 Hong .................... H04L 9/3231

FOREIGN PATENT DOCUMENTS

EP          3579524 A1   12/2019
WO       2019093573 A1    5/2019

\* cited by examiner

IDENTIFICATION VERIFICATION SYSTEM

TECHNICAL FIELD

The present disclosure relates to systems and methods of identification verification and authentication generally and in particular to a secure identification verification system.

BACKGROUND

The widespread use of digital technology enabled by increasingly powerful digital devices and affordable data networks has presaged an era where many commercial, social and legal transactions routinely take place online. Such transactions would have previously required one or more types of physical interactions such as face-to-face meetings, hardcopy documents, meeting rooms, as well as transportation, accommodation and other related costs in time and expense that are associated with facilitating the physical interactions.

The ease provided by digital transmission of information has thus greatly improved the efficiency associated with many types of business, technical, legal and social interactions and transactions. There has been a significant improvement in the speed, convenience and accuracy of communication and information delivery across vast distances. In addition, new forms of digital assets called cryptocurrencies that are designed to work as mediums of exchange, by utilizing cryptography to secure financial transactions, have now emerged. In addition to ease of use and convenience, these digital assets allow for control of the creation of additional units, and verification of the transfer of assets, without the need for centralized control.

As a result, geographic boundaries have lost a large degree of their once formidable significance as barriers to commerce or other socioeconomic interactions. Costs previously associated with the now virtually obviated need for transportation and accommodation have now been eliminated or significantly reduced. As a result, many transactions that are now routine across the globe, such as electronic commerce, take place with a degree of efficiency that would have been virtually unimaginable just a few decades ago.

An unfortunate side effect of the widespread use of digital technology and its ease of use, is the its increasing application for nefarious purposes such as phishing, spam, malware, scams, and the like and the predictable consequence of significant concerns related to privacy, data breach, identity theft and misappropriation of other private data. Such misappropriation of data can be potentially very damaging, leading to immense personal costs to victims.

A more insidious side effect of the theft or misuse of digital data is a pervasive uncertainty leading to general distrust of digital communication technology. This can hamper or at least slow the continued adoption of digital communication in commerce, medicine, government and law enforcement with potentially disastrous opportunity costs of slow adoption into many areas where the technology holds great promise.

Governments and other institutions are thus providing guidance, legislation and regulations aimed at protecting the privacy rights of citizens in our digital era. One prominent example is the European General Data Protection Regulation (GDPR). The regulation aims to allow European Union (EU) citizens to better control their personal data and to modernize and unify rules allowing businesses to reduce red tape and to benefit from greater consumer trust.

There is an increasing need for proper identification, verification and authentication of users. The ability to validate the source of funds in commercial transactions, particularly for cryptocurrency transactions, without intruding unnecessarily into the privacy of users is becoming increasingly important.

There are already a few identity management companies that aim to solve problems associated with the current state of identity management. Many of these companies utilize blockchain technology and often fail to meet the requirements of privacy regulations. Moreover, many of the conventional solutions offered are premised on the implicit or explicit notion that, a third party or a trusted network of members should be relied upon to hold or disseminate personal data.

Accordingly, it is desirable to have improved solutions to the challenges associated with identity verification and management. It is thus an object of the present invention to provide solutions that mitigate at least some of the aforementioned problems related to identify verification.

SUMMARY

In accordance with an aspect of the present invention, there is provided a system for identity verification of a user. The system includes a server having a processor, an input interface in communication with the processor, a network interface in communication with the processor, and a processor readable medium in communication with the processor. The processor readable medium stores processor executable instructions. The processor executable instructions, when executed, cause the processor to take the steps of: receiving user data including an image of at least one document; receiving biometric data of the user from a user device of the user; performing validation of said at least one document using said biometric data; and encrypting the user data with an encryption key obtained from the biometric data.

In accordance with another aspect of the present invention, there is provided a device comprising a processor, an input interface in communication with the processor, a network interface in communication with the processor, and a processor readable medium in communication with the processor. The processor readable medium stores processor executable instructions that, when executed, cause the processor to take the steps of: providing account creation input to a server; uploading documents, data, banking information; providing biometric scan to the server using a biometric sensor; creating at least one encryption key from the biometric scan; and encrypting user data with the at least one encryption key.

In accordance with yet another aspect of the present invention there is provided, a method for identity verification of a user. The method includes receiving user data including an image of at least one document; receiving live data for the user, from a device of the user; performing validation of said at least one document using said live data; obtaining biometric information from said live data; and encrypting the user data with the biometric information.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more embodiments.

DETAILED DESCRIPTION

Figure 1:
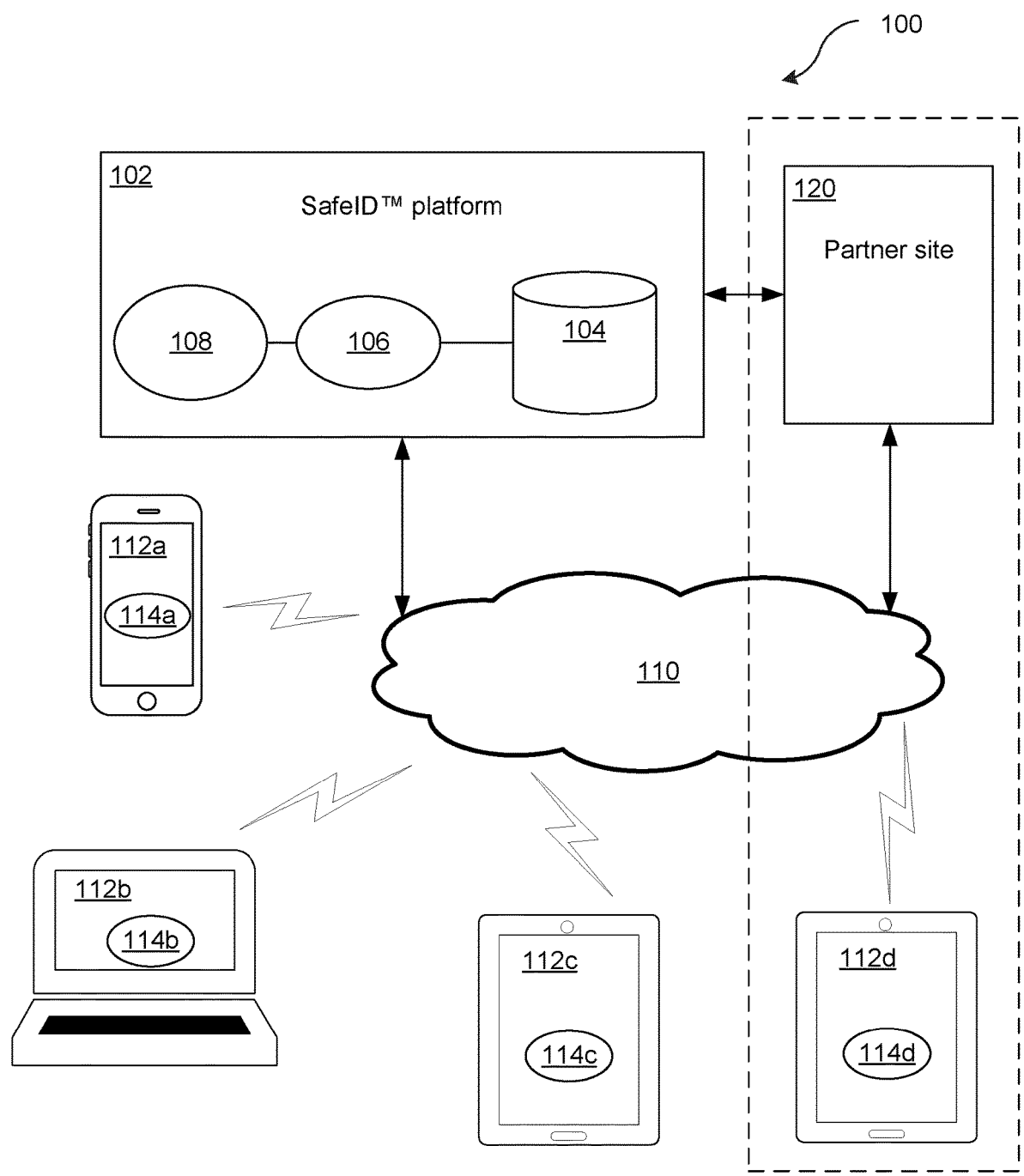
FIG. 1 is a simplified block diagram of a system exemplary of an embodiment of the present invention, having a server in data communication with a plurality of client devices.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one; for example, the term "plurality" includes two or more, three or more, four or more, or the like.

In this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

As used in this disclosure, the term "substantially" is intended to contemplate any and all variations or deviations that are not of material effect.

Overview:

The present disclosure relates to an identification verification system and related methods aimed at introducing novel identification verification and authentication system and methods that exceed the requirement of many current standards aimed at the protection of privacy of users, such as the European General Data Protection Regulations (GDPR). Embodiments of the present invention may thus obviate some of these prevailing current standards, rendering them redundant or even irrelevant.

One specific embodiment of the present invention is an integrated modular platform, dubbed PIMS™ by the applicant of the present patent application, which provides for identification, verification and authentication of users.

More importantly, the protocols utilized by the PIMS™ platform do not share any personal information with third parties without explicit authorization. Embodiments of the present invention do not rely on "trust networks" to prove identity and authentication of individual users.

Many identity verification companies exist that often rely on blockchain technology to solve the identity verification problem as a stand-alone solution. However, the solutions proposed by these companies fail to meet all the requirements noted above. Many of these firms begin with the premise that third parties or members of your trust network should be relied upon to hold or disseminate personal data.

Embodiments of the present invention such as the PIMS™ platform are closed, permission-only based systems between the owner of the information and the party requesting the information. The exemplary platform is a highly secure, identity verification platform that enables users or consumers to protect and manage their own identity related data rather than entrusting a potentially unreliable third party.

The exemplary platform, which will be described in detail below, provides individual users with the opportunity to create a single, lifelong identity designed to be equally adaptable to both the digital realm and brick and mortar real-world applications. The digital identity enabled by the exemplary platform aims to replace the numerous (estimated to be over 130) identities, logins and physical identify cards or that most individuals have to navigate on daily basis in order to participate in the 24-hour digital realm.

System Architecture

FIG. 1 depicts a simplified block diagram of a system 100 exemplary of an embodiment of the present invention. As depicted in FIG. 1, the system 100 is a platform that includes a server-side computing system 102 in data communication with electronic devices 112a, 112b, 112c and 112d (individually and collectively, "devices 112") via a network 110. Devices 112 may be personal computers (PCs), tablets, mobile devices and the like.

Server-side computing system in the form of server 102 comprises a database 104, a web-server software 108, and an application logic 106 therebetween and adapted for facilitating communication between the database 104 and the web-server software 108.

As contemplated in this first embodiment, server-side computing system 102 is a server. The server 102 includes a web-server software 108 running thereon, the web-server software 108 adapted for communicating with an instance of a client application such as a mobile app 114a, desktop or laptop client application 114b or a tablet application 114c (individually and collectively "client application 114") running on a device 112. The web-server software 108 can be any suitable web-server software that is adapted to permit client applications, mobile apps or browser software running on devices 112 to access data on server 102 through network 110. Suitable web-server software includes, but is not limited to, the Apache HTTP Server, the Internet Information Server (IIS). In other embodiments, the server side computing system can be a system comprising a network of computers (e.g. database server computer, application logic server computer, web-server computer), or a cloud service that uses a large network of server computers (e.g. database server computers, application logic server computers, web-server computers), the server computers collectively hosting multiple instances of application logic server software, database software, and web-server software. In other embodiments, the system does not include a web-server software running on a server that communicates to a client application running on devices 112.

Server 102 is accessed by devices 112 that each run a client application (e.g. app 114a), or mobile browser software, via the Hypertext Transfer Protocol (HTTP) or its secure version (HTTPS) for data entry, image uploading, data editing, report generation, account configuration, changing settings, buying, selling, sending and receiving messages and various other activities enabled by the electronic commerce platform as will be described later. In other embodiments, the server is not accessed via HTTP or HTTPS, but instead is accessed via another suitable protocol.

Application logic 106 executing on server 102 implements application logic rules for system 100. As contemplated in this first embodiment, application logic 106 can be implemented as software components, services, server software, or other software components forming part of application logic 106. Application logic 106 encodes specific business rules determining the creation, manipulation, alteration, generation, or verification of data using data received from devices 112 or retrieved from database 104.

Database 104 provides storage for persistent data. Persistent data includes, but is not limited to, data pertaining to user records, rules for user profile analysis, image comparison modules, identity verification module, address verification rules and the like. As is known in the art, persistent data is often required for applications that reuse saved data across multiple sessions or invocations. As contemplated in this first embodiment, database 104 is supported by a relational database management software (RDBMS), and is encrypted. Suitable RDBMS include, but are not limited to, the Oracle server, the Microsoft SQL Server database, the DB2 server, MySQL server, and any alternative type of database such as an object-oriented database server software. Encryption can be done by any method known in the art. Suitable encryption methods or algorithms include, but are not limited to, RSA public-key encryption, Advanced Encryption Standard (AES), Triple Data Encryption Algorithm (3DES), and Blowfish. In other embodiments, the database on the server side computing system is not an RDBMS. In other embodiments, the database is not encrypted.

In other embodiments, server 102 has a separate database server hardware to host database 104 software. In other embodiments, the system has a separate application server computer for the purpose of providing additional resources in terms of CPU, memory capacity, and storage capacity in order to improve the performance of the system. In other embodiments, the system further comprises a business logic server that is external to server 102, the business logic server for hosting an application logic (e.g. application logic 106). Other computing devices suitable for communication with server 102 or as devices 112 include, but are not limited to, server class computers, workstations, personal computers, and any other suitable computing device.

A partner site server 120 may be in communication with server 102. Partner site server 120 may include a web server module, an application logic server and a database and other common components found on server 102, which will not be further described.

As contemplated in this first embodiment, network 110 is the Internet. In other embodiments, the network can be any other suitable network including, but not limited to, a cellular data network, Wi-Fi™, Bluetooth™, WiMax™, IEEE 802.16 (WirelessMAN), and any suitable alternative thereof. The suitable data communications interface contemplated in this embodiment between devices 112 and network 110 is wireless. The interface can be an antenna, a Bluetooth™ transceiver, a Wi-Fi™ adapter, or a combination thereof.

As contemplated in this first embodiment, devices 112 include a smartphone device 112a, a laptop computer 112b and a tablet 112c. Other non-limiting examples of such electronic devices include personal digital assistant (PDA), cellular telephone, smartphone (e.g. iPhone™, Blackberry™, Windows™ Phone), media player (e.g. iPod™), and a device which combines one or more aspects or functions of the foregoing devices. In other embodiments, the devices can be any other suitable electronic devices having a suitable wired or wireless data communications interface to network 110.

Devices 112 may be used by the users of system 100 to participate in activities facilitated by the system 100 including, but not limited to, account creation, email registration, identity validation, encryption of user data, digital token processing at the platform of system 100 called PIMS™ platform by the applicant of the subject application or at partner sights.

Each device 112 is equipped with a client application 114 (shown as apps 114a to 114c in FIG. 1). As contemplated in this first embodiment, apps 114 communicate with server software 108 via network 110.

Server Hardware

Figure 2:
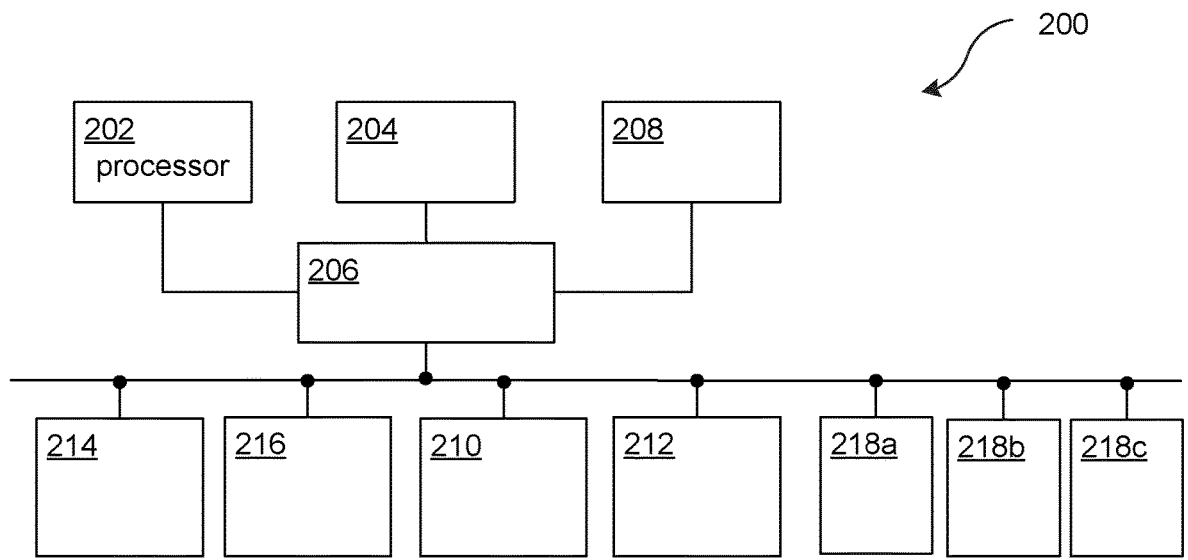
FIG. 2 is a simplified block diagram of computing device hardware for the server depicted in FIG. 1.

Referring to FIG. 2, and according to an embodiment of server 102, there is depicted a simplified block diagram of computing device hardware 200. Hardware 200 comprises a processor 202 such as, but not limited to, a microprocessor, a memory medium 204, and interface circuit 206 adapted to provide a means of communication between processor 202 and memory medium 204.

Interface circuit 206 also interconnects input and output (I/O) components such a display 214, a network adapter 216, and a storage medium 210. Interface circuit 206 further interconnects an input device 208, which may be a keypad or keyboard, a touch or a multi-touch panel, which may have a software keyboard or keypad displayed thereon, or the like. In the depicted embodiment, interface circuit 206 also interconnects a printer 212 and one or more additional peripherals 218a to 218c (individually and collectively, peripherals 218).

Suitable peripherals 218 include, but are not limited to a keyboard, a camera, a scanner, a touch panel, a joystick, an electronic mouse, touch screen, trackpad, and other sensor devices, input devices or pointing devices, or any combination thereof. In other embodiments, the interface circuit does not interconnect a printer. In other embodiments, the interface circuit does not interconnect any peripherals.

Memory medium 204 may be in the form of volatile memory or a combination of volatile and non-volatile memory, including, but not limited to, dynamic or static random-access memory (RAM), read-only memory (ROM), flash memory, solid-state memory and the like.

Interface circuit 206 includes a system bus for coupling any of the various computer components 210, 212, 214, 216, 218 to the processor 202. Suitable interface circuits include, but are not limited to, Industry Standard Architecture (ISA), Micro Channel Architecture (MCA), Extended Industry Standard Architecture (EISA), VESA Local Bus (VLB), Peripheral Component Interconnect (PCI), Peripheral Component Interconnect Extended (PCI-X), Accelerated Graphics Port (AGP), Peripheral Component Interconnect Express (PCIe).

Storage medium 210 can be any suitable storage medium including, but not limited to, a hard disk drive (HDD), a solid-state drive (SSD), EEPROM, CD-ROM, DVD, and any other suitable data storage element or medium. Storage medium 210 is readable by processor 202.

Display 214 can be any suitable display including, but not limited to, a touch screen.

Network adapter 216 in server 102 facilitates wired or wireless connections to an Ethernet, Wi-Fi™, Bluetooth™, cellular network or other suitable network, thereby enabling connection to shared or remote drives, one or more networked computer resources, other networked devices, I/O peripherals and the like. Devices 112 also contain complementary network adapters therein for connecting with a suitable network, and are further equipped with browser or other thin-client or rich-client software. Network adapter 216 includes a wired or wireless network interface card that allows communication with other computers through a data network such as network 110. As contemplated in this embodiment, network adapter 216 comprises a wireless network interface card. In other embodiments, the network adapter does not comprise a wireless network interface card and communicates with the network via a wired connection.

User Device Hardware

Figure 3:
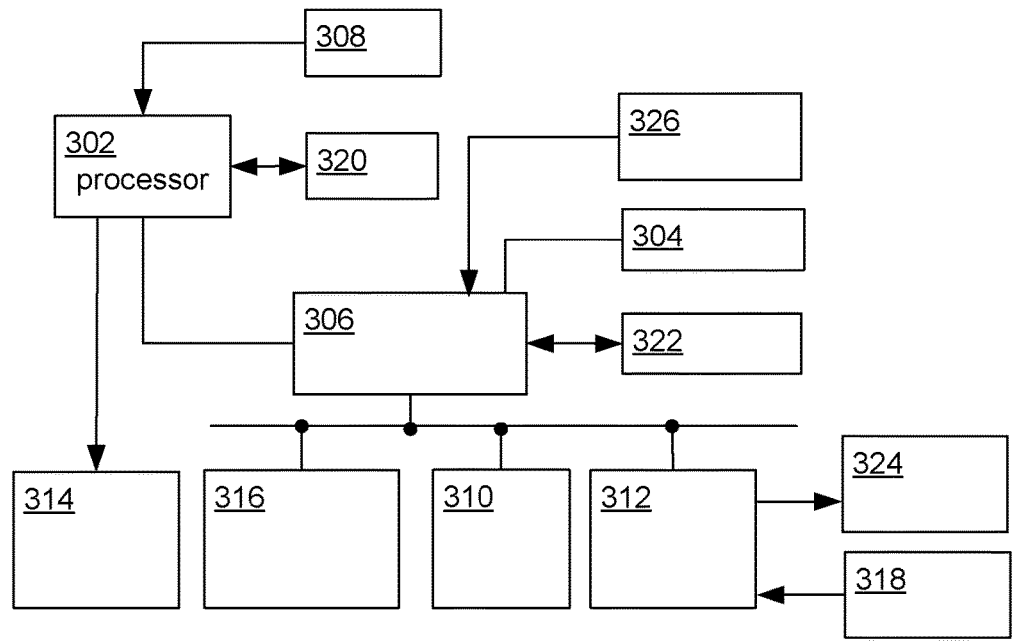
FIG. 3 is a simplified block diagram of a device used by a user in the system depicted in FIG. 1.

Referring to FIG. 3, and according to an embodiment of a device, there is depicted a simplified block diagram of device 112. As shown, user device 112 comprises a processor 302 such as, but not limited to, a microprocessor or a central processing unit, a memory medium 304, a touch input 308, a battery 320, and a display 314.

Components 302 and 304 communicate with each other through an interface circuit 306. Interface circuit 306 also interconnects components including, but not limited to, a wireless network interface 316, a storage medium 310, an input-output (I/O) interface 322, a biometric sensor such as a camera 326 and an audio codec 312. Audio codec 312 in turn connects to one of more microphones 318 and one or more speakers 324.

Wireless network interface 316 includes one or more of a wireless LAN transceiver (e.g. Wi-Fi™ transceiver), an infrared transceiver, a Bluetooth™ transceiver, and a cellular telephony transceiver. I/O interface 322 may include one or more wired power and communication interfaces such as a USB port.

Input 308 may be a keypad or keyboard, a touch panel, a multi-touch panel, a touch display or multi touch display having a software keyboard or keypad displayed thereon. Camera 326 may form part of device 112 or attached as an external peripheral attachment. Camera 326 is used in many user verification steps as will be described later.

In alternate embodiments, user device 112 may have the same components as depicted in FIG. 2 and described above with reference to components of server 102.

Signing Up to the PIMS™ Platform

In operation, a user signs up with the PIMS™ platform using system 100. An exemplary process 400 from the perspective of server 102 is summarized using a flowchart in FIG. 4.

As shown, initially at step 402, server 102 receives user account creation input data from the user. The input data may be received from any one of devices 112, which as discussed earlier, may be in the form of PC, tablet, mobile device, or another computing device. In this exemplary embodiment, a user chooses a service option from a list of available options, which include but are not limited to a basic option or a concierge option.

Server 102 then requests the user to supply payment details in order to process the request in the form of credit card information or other financial information at step 403. After payment is process and confirmed, user is granted access to a module for setting up a profile. Server 102 then initiates a validation and authentication process.

Server 102 uses credit card information provided such as name, street address, city, country, postal code or zip code, address validation service (AVS) and card verification code (CVC) as the initial check and cross validation against the subsequent documents such as government issued identification that the user will be requested to provide.

At step 404, server 102 receives user registration and confirmation input from the user. In this step, the user is requested to provide a valid email and phone number. In this embodiment, server 102 validates the email address received, by first sending a validation code to the user at the email address, and thereafter entering the code into the client application 114 for validation. Then, a text is sent to the provided phone number and user will be required to enter the validation code into the client application 114 for validation. Other validations methods may be used in alternate embodiments.

Once the user has confirmed their email address and phone number, at step 405, server 102 initiates an identity verification procedure on the client application 114. As will be discussed later with reference to FIG. 5, during this procedure, the user will be prompted to provide a series of documents including one or more of government issued identification cards, a utility bill, banking information and "liveness selfie detection" input.

At step 406, server 102 performs data comparison operations for user profile analysis. The PIMS™ platform implemented on server 102 initiates and compiles the data provided, compares various data points such as comparing selfie photo to photo provided on an identification (ID) having a photo on the client application 114. In addition, the name, address, and other parameter received are run against several official databases or government registries including but not limited to those maintained by the Federal Bureau of Investigation (FBI) in the United States, INTERPOL, databases of known terrorists, etc. The user is classified based on the above analysis as well as other segmentation or profiling parameters such as income and spending habits and a unified profile is generated based on all submitted information provided and verified. All verification and validation is performed on the users' device.

At step 407, server 102 will prompt user to scan his or her face.

At step 408, server 102 uses the obtained biometric data in the form of a facial scan for the first encryption key.

At step 409, server 102 will prompt user to select an encryption pattern.

At step 410, server 102 uses the selected pattern as a second encryption key.

The client application 114 will generate two additional encryption keys specific to the user's device 112 and location. These will be the third and fourth encryption keys.

The device 114 uses an encryption engine in the form of an encryption software and keys generated to encrypt the user's personal data and profile and stores the encrypted data on the user's device 112 such as mobile device 112a.

A unique digital token generated by device 112. The digital token is unique to the user and can be used to sign up on any website, financial institution or other organization that is part of the PIMS™ network. Credit card companies, financial institutions and merchants can be assured that users signing up using the PIMS™ token have been validated, verified and authenticated.

In this embodiment, users will be requested to decrypt their data periodically (e.g., on a monthly basis) so server 102 can rerun their respective information against various official and non-official lists, databases and registers as discussed earlier.

Figure 4:
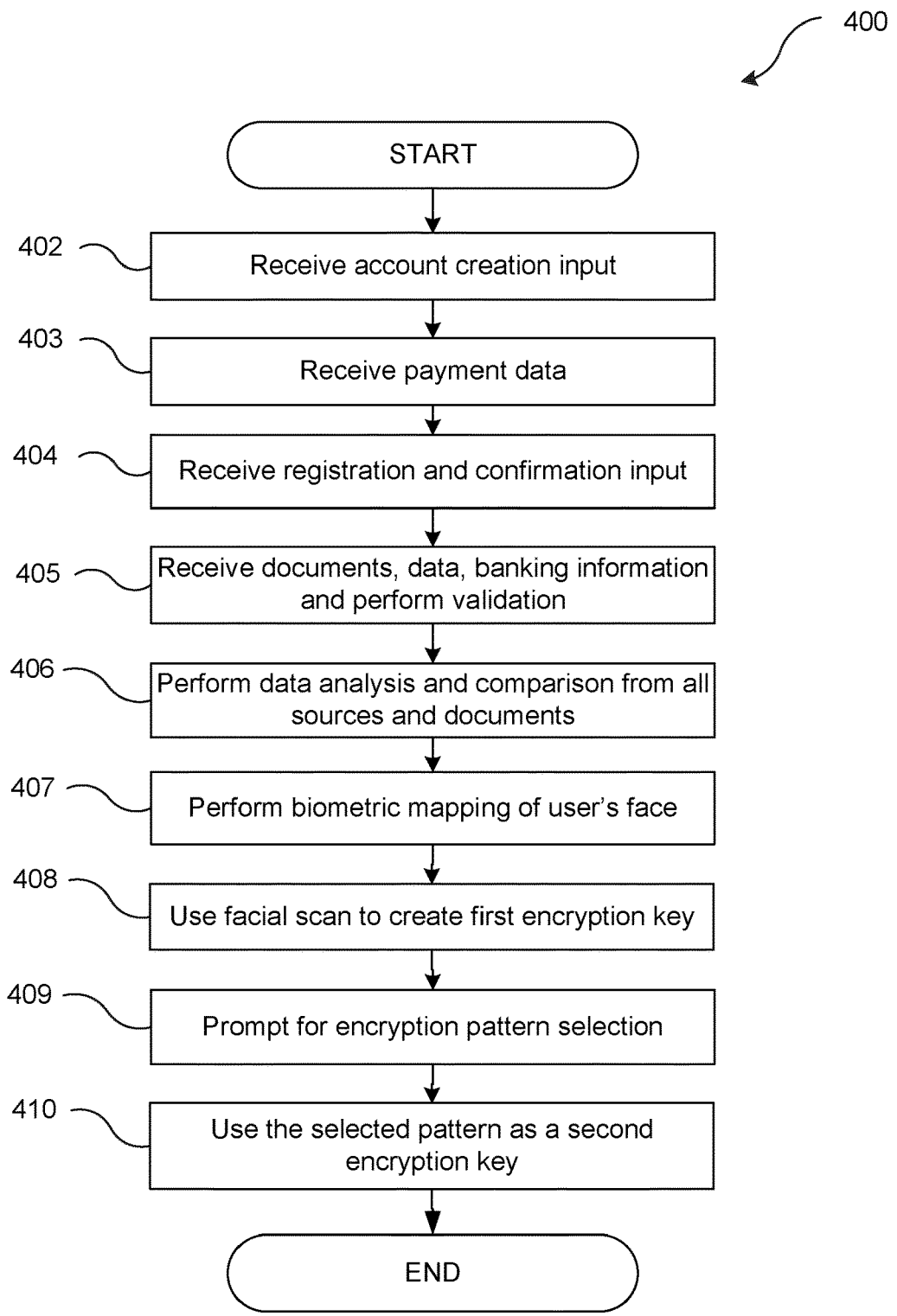
FIG. 4 is a flowchart depicting steps in an exemplary process carried out by the server of FIG. 1.
Figure 5:
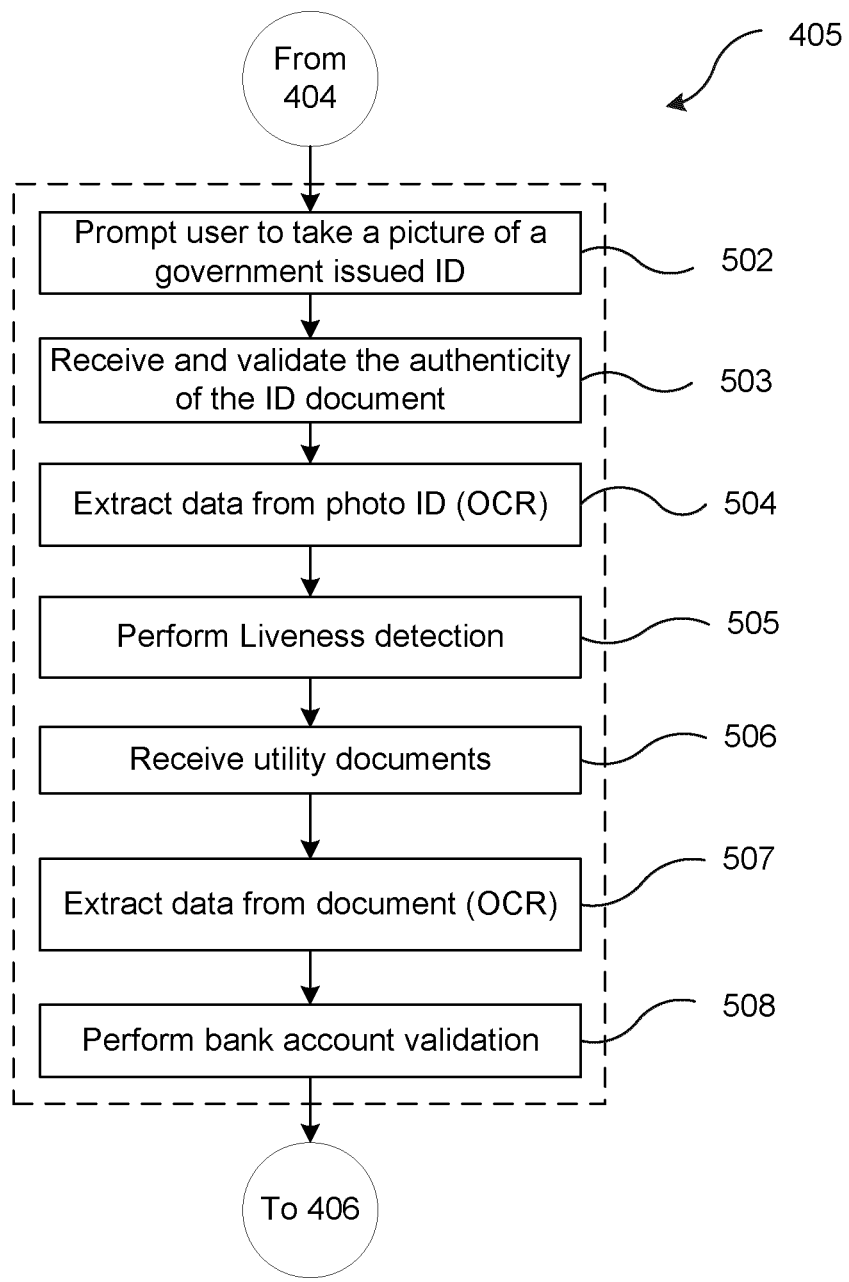
FIG. 5 is a flowchart depicting sub-steps involved in the identity validation step of the process depicted in FIG. 4 in an exemplary embodiment of the present invention.

FIG. 5 illustrates sub-steps involved in step 405 of FIG. 4. In one embodiment, to receive documents and data and perform identity validation, the server 102 may prompt the user to take a picture of an identification (ID) document such as a government issued photo-ID (step 502).

Server 102 may then validate the authenticity of the ID document (step 503) and extract data from the photograph of the ID (step 504) which may involve the well-known use of optical character recognition (OCR).

Server 102 may then perform liveness detection (step 505). Next, server 102 may request and receive a utility bill (step 506) for verification, authenticity and data extraction using optical character recognition (step 507). Server 102 will then perform bank account validation (step 508).

Figure 6:
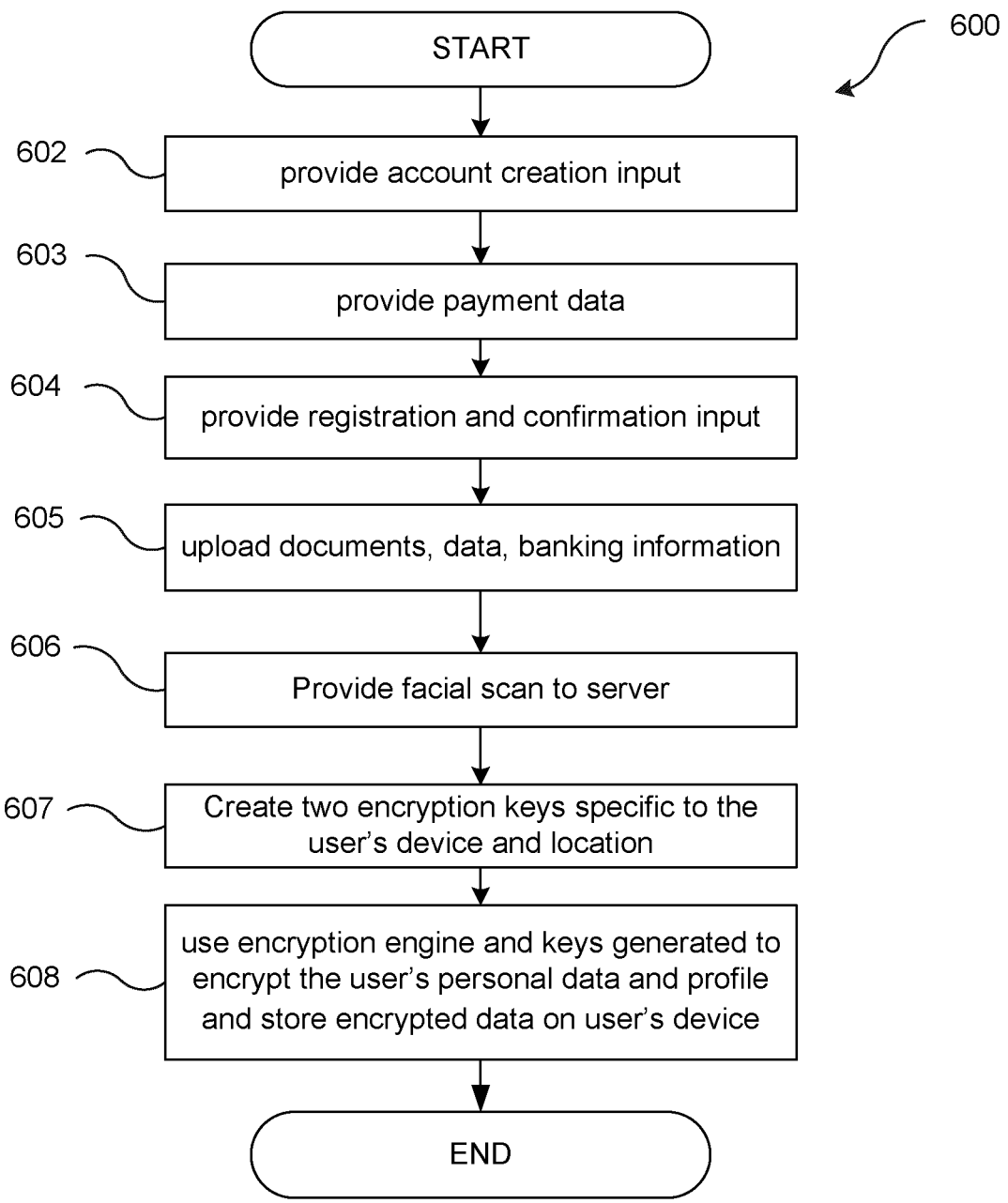
FIG. 6 is a flowchart depicting in an exemplary process carried out by a user device of FIG. 3.

An exemplary process 600 from the perspective of device 112 is summarized using a flowchart in FIG. 6.

Initially at step 602, device 112 provides account creation input to server 102. This input is received by server 102 as described above. As may be appreciated, many of the steps by device 112 enumerated below have corresponding or complementary steps performed by server 102.

At step 603, device 112 provide payment data to server 102 and at step 604, device 112 provides registration and confirmation input to server 102.

At step 605, device 112 uploads documents, data, banking information and perform validation to server 102. These documents and data are used for validation by server 102 as noted above.

At step 606, device 112 provides biometric data in the form of a facial scan to server 102. The facial scan may be taken by camera 326.

At step 607, device 112 creates two encryption keys specific to the device 112 and its location.

At step 608, device 112 uses an encryption engine in the form of an encryption software and keys generated at step 607 to encrypt the user's personal data and profile and stores encrypted data on device 112.

Signing Up to Partner Sites

The PIMS™ platform running on server 102, may be used by partner organizations or companies such as merchants or other partners having their own websites or other networks. In one embodiment, a partner such as a merchant is first approved to use the platform, and subsequently on-boarded so that it can utilize the platform.

The partner can utilize the PIMS™ platform on server 102 through application programming interface (API) to integrate the sign-up or login process into its own site (i.e., network, website, portal or platform) executing on server 120 with that of the PIMS™ platform running on server 102 and client application 114.

During the setup process, the partner will be able to set and enable onboarding rules. These rules will allow the partner to set restrictive criteria based on age, geographic location and the like to prevent users who do not meet the specified customer demographic profile from accessing their site. Advantageously, this may save time and cost for the partner.

Figure 7:
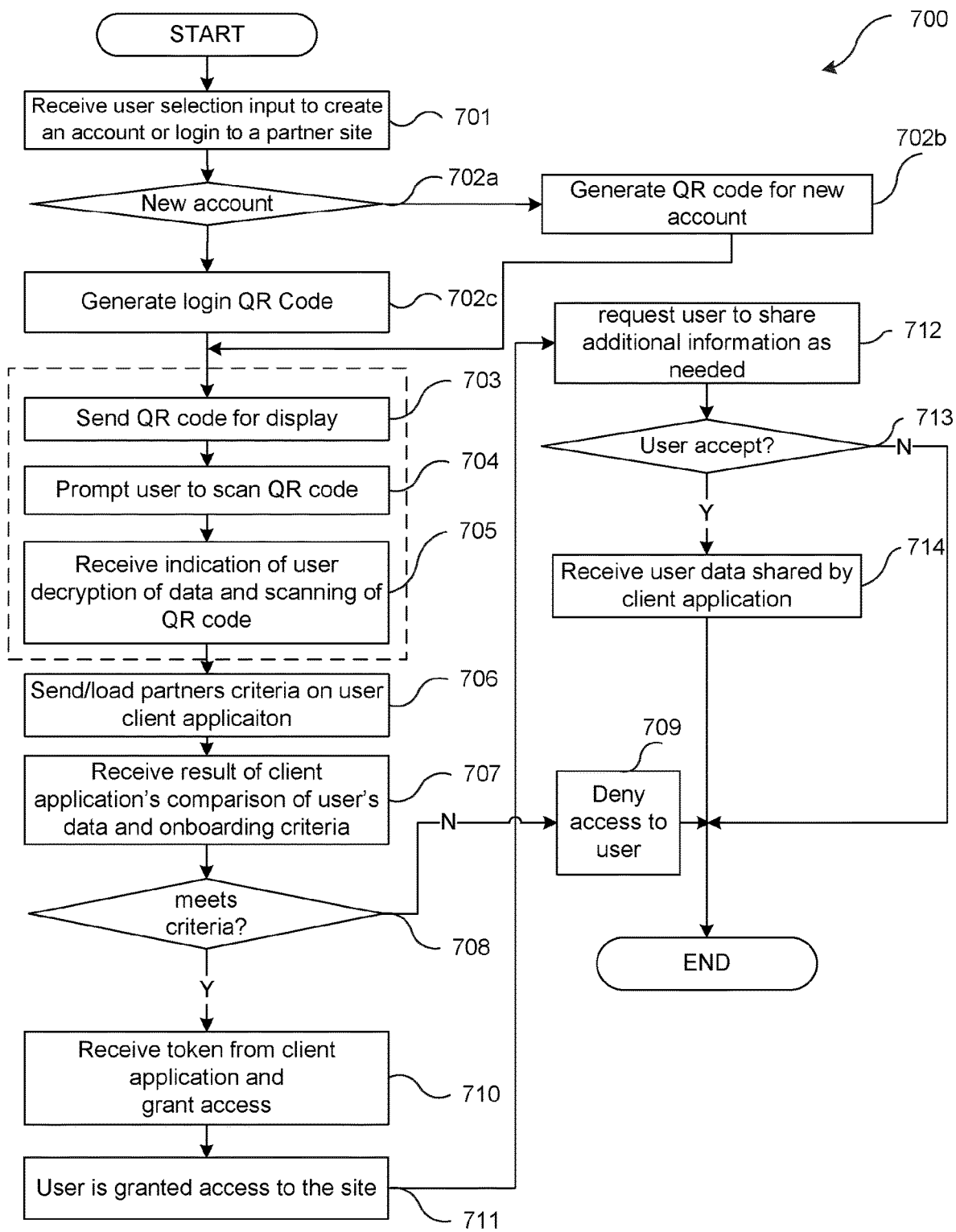
FIG. 7 is a flowchart depicting steps in an exemplary process executed by a computing device or server at a partner site in communication with the server of FIG. 1.

An exemplary process 700, executed by the computing device or partner site server 120 running a partner site, is summarized in a flowchart of steps depicted in FIG. 7.

As shown at step 701, the partner site server 120 receives input from the user either to create an account or to login on the partner site server. At this point, the partner site server 120 receives PIMS™ login or if a new account is desired (step 702a) account creation QR code data.

Upon receiving PIMS™ QR code data, at step 702, the partner site server 120 generates a unique QR code (step 702b).

At step 703, the QR code generated at step 702b or 702c is sent to be displayed for the user, for example on device 112d.

At step 704, the partner site server 120 prompts the user to scan the QR code using camera 326 embedded in the device 112 (e.g., tablet or mobile device 112d) being used by the user.

At step 705, the partner site server 120 receives indication that the user to decrypted his or her data on the client application 114 and scanned the QR code.

At step 706 the partner site server 120 sends the partners onboarding criteria.

At step 707 partner site server 120 receives data indicative of the comparison of user data and partner criteria. The comparison itself is carried out at the user's device 112 thereby ensuring that the private user data remains on the user's device 112.

At step 708, partner site server 120 receives data indicative of whether the user data meets the demographic or other criteria set out by the partner. In this embodiment, the client application 114 checks if the user data meets the demographic or other criteria set out by the partner and provides the result to partner site server 120.

If user data does not meet the demographic or other criteria set out by the partner, then at step 709 the user is denied access to the partner site and the process 700 terminates.

Otherwise, if user data meets the demographic or other criteria set out by the partner, then at step 710 the partner site server 120 receives the user's digital token. No user data is transferred to the partner site server 120 at this point unless user provides explicit consent.

At step 711, the partner site server 120 grants access to the site to the user. If more data is needed, then the partner site server 120 prompts the user for more data (step 712).

If the user accepts the request (step 713), the requested data is shared with the partner and the partner site server 120 receives verified user data (step 714). The process 700 then terminates.

In a variation of the above embodiment, the server 102 may perform advanced partner or merchant approval and validation. This involves server 102 analyzing a merchant website, obtaining and checking registered corporate documents and the like.

Encrypted Mass and Direct Messaging

Using embodiments implementing the PIMS™ platform, partners will be able to send mass or direct messages to the users that have been on-boarded using Cycurid™—an interactive platform technology that provides a secure environment in which to exchange transaction related personal information.

This process increases the delivery and read rate, eliminate the chance of emails getting to spam and junk and is extremely targeted.

Personal ID Market Place

A personal ID market place may be understood as a place or an exchange where government institutions, financial institutions, businesses, merchants and the like can post their requirement in terms of personal data they are seeking.

Users may also participate in selling or exchanging their verified private data in the market place. For example, a business may be looking for demographic information such as age, sex, geographic location, etc. related to anyone that likes to drive a particular brand of vehicle such as Honda®. During the time of trade, the business can offer some form of compensation in exchange for the users' data.

The users will need to login to the client application 114 by decrypting their data. Once users have logged in, they will be able to go to the market place and filter through the different postings and search based on the deal, type of data requested, categories and various other fields and select which information they want to share with that specific deal.

In alternative embodiments, user may exchange of their data securely in the personal ID market place. Users of PIMS™ are able to sell parts of their verified personal information that have market value based on demand by government institutions, financial institutions, businesses, merchants and the like.

Such embodiments would mitigate part of the problem in the current landscape where users often register with erroneous information and so the data, which businesses collect, is often worthless.

Using processes exemplary of embodiments of the present invention, users may register their unique digital token in a centralized PIMS™-compliant personal ID marketplace. Upon registration, the user's data would be compiled according to predefined categories such as age, income, spending habits etc. or categories already submitted for PIMS™ approval.

In one embodiment, geographic, demographic, or other segments may be created. Verified entities such as businesses or other institutions may then access the personal ID marketplace and purchase macro information about particular segments of interest for targeting.

These verified entities may be provided with at least two options. The first option is to purchase macro data with no personal name address associated. The second option may permit approaching individuals through their respective encrypted secure PIMS™ messaging client (e.g., email, text, messaging applications such as Whatisapp™, Viber™, or social media account such as Facebook™ or LinkedIn™ and the like) and request the user to release or sell, his or her personal data. The transactions would be direct with and between the entities and user with the proceeds going to the user. The cost to business entities would become a customer acquisition cost.

Advantageously, at least some embodiments of the present invention provide a solution that significantly reduces the personal digital footprint of individuals, by storing personal data through biometric encryption on personal mobile device thereby mitigating the problems associated with loss of privacy, identity theft, impersonation and other misappropriation or misuse of personal data by unauthorized persons or institutions.

Other Advantages:

As noted above, exemplary embodiments of the present invention, provide individual users with the opportunity to create a single, lifelong identity designed to be equally adaptable to both the digital realm and brick-and-mortar type real-world applications. The verifiable, durable digital identity enabled by the exemplary platform aims to replace the numerous identities, logins and physical identify cards or that most individuals have to navigate on daily basis in order to participate in online world.

The exemplary of embodiments of the present invention do not use blockchain. The disadvantages associated with blockchain technology are thus avoided. The disadvantages of blockchain technology include use of excessive energy, lack of scalability, anonymity, increasing complexity and inefficiency.

The solutions taught by the present patent application are based on the premise that a user's personal data is owned by the user and ownership and governance of the identity is the responsibility of the user; and that third parties should not hold, store, collect or use personal information without the express consent of the owner. Additionally, embodiments of the present invention aim to ensure that when consent is given by a user to share personal data, the user should be compensated for sharing his or her personal data.

The simple business model is enabled by embodiments of the present invention that allows users pay a low periodic fee (e.g., a yearly fee) to enroll. The PIMS™ platform does not store any personal data on its server 102 and all data is stored on the respective users' device 112 secured via biometric encryption. For businesses the benefits include reduced cost of KYC/AML (know your client/anti-money laundering) compliance, reduced legal risk associated with the safeguarding of consumer personal data as well as risk associated with "express consent" and other related reputation risks.

General:

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein but should be given the broadest interpretation consistent with the description as a whole.

What is claimed is:

1. A system for identity verification of a user, the system comprising: a server comprising a processor, an input interface in communication with the processor, a network interface in communication with the processor, and a processor readable medium in communication with the processor, the processor readable medium storing processor executable instructions that, when executed, cause the processor to take the steps of:
    (a) receiving user data including an image of at least one document;
    (b) receiving real time biometric data of the user from a user device of the user;
    (c) performing validation of said at least one document using said biometric data; and
    (d) encrypting the user data with an encryption key obtained from the biometric data.

2. The system of claim 1, wherein the biometric data is live biometric data.

3. The system of claim 2, wherein the live biometric data is facial scan data.

4. The system of claim 1, wherein the processor further performs the steps of: (i) receiving a digital token generated by the user device, and wherein said digital token is unique to the user; and (ii) processing said digital token.

5. The system of claim 4, wherein said server erases said biometric data and said image of at least one document obtained from said user after said encrypting.

6. The system of claim 1, wherein the processor further performs the step of receiving account creation input data and associated registration and confirmation data from said user device.

7. The system of claim 1, wherein said user data comprises one or more of banking information and data related to at least one bill.

8. A method for identity verification of a user, comprising: (a) receiving via a processor user data including an image of at least one document; (b) receiving via the processor live data for the user, from a device of the user; (c) validating via the processor said at least one document using said live data; (d) obtaining via the processor biometric information from said live data; and (e) encrypting the user data with the biometric information.

9. The method of claim 8, wherein the biometric information is live biometric data.

10. The method of claim 9, wherein the live biometric data is facial scan data.

11. The method of claim 8, wherein the processor further performs the steps of: (i) receiving a digital token generated by the user device, and wherein said digital token is unique to the user; and (ii) processing said digital token.

12. The method of claim 11, further comprising erasing from a server said biometric information and said image of at least one document obtained from said user after said encrypting.

* * * * *